March 30, 1965  W. SCHÄFER ETAL  3,175,645
SHOCK ABSORBER WITH PRIMARY AND SECONDARY DAMPING CHAMBERS
Filed Sept. 12, 1963
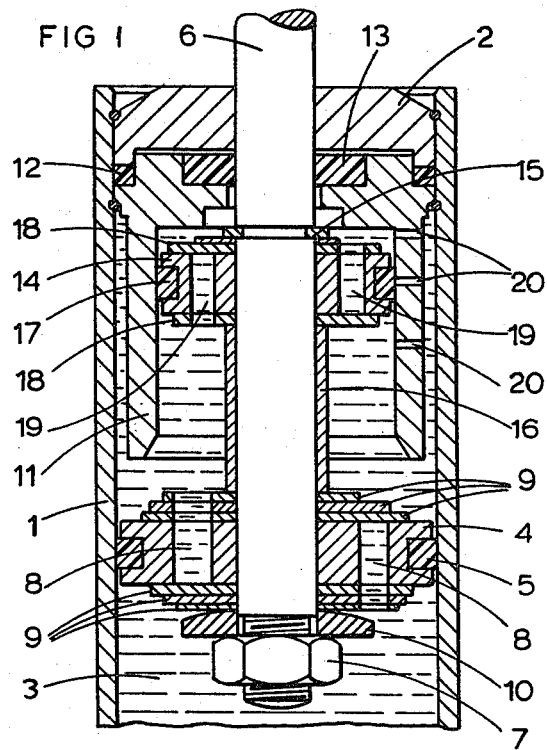
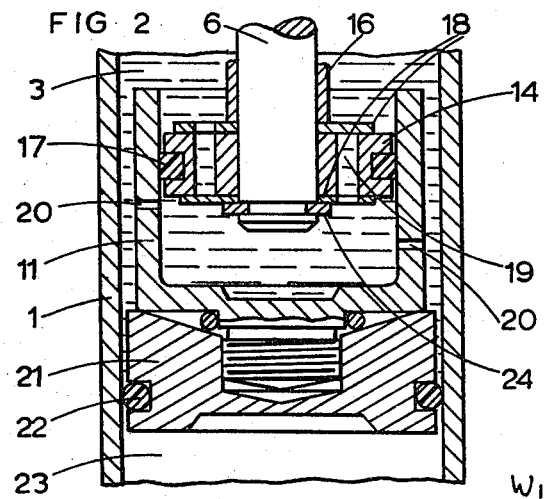
INVENTORS
WILLI SCHÄFER
AND GUSTAV KEITEL
ATTYS.

3,175,645
SHOCK ABSORBER WITH PRIMARY AND SECONDARY DAMPING CHAMBERS

Willi Schäfer, Kesselheim, and Gustav Keitel, Koblenz-Neuendorf, Germany, assignors to Stabilus Industrie- und Handelsgesellschaft m.b.H., Koblenz-Neuendorf, Germany
Filed Sept. 12, 1963, Ser. No. 310,188
Claims priority, application Germany, Sept. 13, 1962, St 19,710/62
5 Claims. (Cl. 188—87)

The invention relates to a shock absorber with one or more damping steps which come into action in dependence on the extent to which the piston rod moves in or out.

Shock absorbers with one damping step are known, but in them the braking action varies abruptly in dependence on the pressure. This is undesirable for certain applications, as pressure-dependent adjustment cannot be effected with the necessary degree of accuracy due to fluctuations in temperature and to the high piston speeds often occurring in practice.

The present invention accordingly aims to make a shock absorber with one or two damping steps, wherein the latter come into action in dependence on the extent to which the piston rod moves in or out. The problem is basically solved in that an additional piston is fixed on the piston rod and in that the reciprocal movement in the working space associated with the additional piston is such as to produce a damping performance which is additively superimposed on the damping performance of the main piston.

In accordance with the invention there is provided a shock absorber comprising a main damping cylinder adapted to contain a damping fluid, a main damping piston and piston rod operable in said main cylinder to provide a damping action, at least one secondary damping cylinder and at least one secondary damping piston mounted on said piston rod and operable in said secondary cylinders to provide a further damping action superimposed upon the damping action of said main piston.

The invention will further be described with reference to the accompanying drawings which are presented by way of illustration only and in which:

FIG. 1 is a diagrammatic longitudinal section through part of one construction of shock absorber according to the invention, and FIG. 2 is a diagrammatic longitudinal section through part of another embodiment of the invention.

Referring first of all to the construction illustrated in FIG. 1, the shock absorber comprises a main damping cylinder 1 closed by an end plate 2 and containing a damping fluid 3. Operable in the main cylinder is a main piston 4 sealed against the cylinder wall by a peripheral sealing ring 5 and secured on the end of the piston rod 6 by means of the nut 7. Flow channels 8 through the piston 4 are closed on opposite sides of the piston by spring plates 9 which serve as oppositely directed non-return valves for the damping fluid. A damping 10 having a curved surface engaging against the outermost spring plate 9 serves to hold the spring plates in place.

So far the construction of the shock absorber is conventional. However, in accordance with this invention, the shock absorber comprises a secondary damping cylinder 11 axially mounted within the main damping cylinders. The secondary cylinder 11 has an open end at one end which is directed towards the main piston 4. The secondary cylinder 11 engages against the end plate 2 of the main damping cylinder and is sealed from the inner wall of the main cylinder by a sealing ring 12. The secondary cylinder 11 also carries the piston rod seal 13. Operating in the secondary cylinder 11 is a secondary piston 14 secured on the piston rod 6 between a retaining washer 15 engaging in a groove in the piston rod and a sleeve 16 extending between the main piston 4 and the secondary piston 14 and surrounding the piston rod 6. The secondary piston 14 is sealed against the inner walls of the secondary cylinder by means of a peripheral sealing ring 17 and is provided on opposite faces with spring plates 18 which serve as oppositely directed non-return valves for damping fluid through the flow channels 19 in the secondary piston.

In operation of the shock absorber illustrated in FIG. 1, the damping effect of the secondary piston in the secondary cylinder is superimposed upon the damping effect of the main piston for as long as the secondary piston is within the secondary cylinder. However, when the piston rod is displaced axially to such an extent that the secondary piston is outside the secondary cylinder its damping effect while in the main cylinder will be virtually nil. Thus the shock absorber, in accordance with the invention, has two distinct damping actions depending upon the displacement of the piston rod. Different damping actions can therefore be obtained by varying the axial position of the piston rod.

The damping characteristics of shock absorbers provided in accordance with the invention may be further modified by the provision in the walls of the secondary cylinder 11 of one or more flow passages 20 which permit flow of damping fluid 3 between the secondary cylinder 11 and the main cylinder 4. These flow passages 20 may be of different diameters and spaced axially in the wall of the secondary cylinder at different intervals. In this way the damping action of the shock absorber will differ with different axial positions of the piston rod in accordance with the number and size of flow passages 20 lying on the pressure side of the secondary piston. By control of the size of these flow passages between the two cylinders and their axial position, the damping action of the shock absorber may be closely controlled.

The embodiment illustrated in FIG. 2 differs from that illustrated in FIG. 1 only in the different relative positions of the two cylinders. In the second embodiment the secondary cylinder 11 is on the opposite side of the main piston (not shown) and is seated on a separating member 21 which is sealed against the inner wall of the main cylinder 1 by means of a peripheral sealing ring 22. The separating member 21 serves, in a known manner, to divide the main cylinder into two parts the upper part containing the damping fluid 3 and the lower part containing air which forms an air cushion 23.

In the second embodiment the secondary piston 14 is retained on the outer end of the piston rod 6 by the washer 24 and is separated from the main piston 4 on the upper part of the piston rod (not shown) by the sleeve 16. The secondary piston 14 is of substantially the same construction as that illustrated in FIG. 1 having a peripheral sealing ring 17 and two non-return valve plates 18 closing flow channels 19 in the secondary piston. The secondary cylinder 14 is provided with flow passages 20 extending through the wall thereof as in FIG. 1.

Shock absorbers constructed in accordance with the second embodiment operate in a similar manner to that described with reference to FIG. 1. The damping characteristics are controllable by axial adjustment of the piston rod and are dependent upon whether the secondary piston is in or out of the secondary cylinder and upon the number and size of the flow passages 20 on the pressure side of the secondary piston.

In a further embodiment according to the invention the construction illustrated in FIGS. 1 and 2 may be combined giving a shock absorber having a main damping cylinder and piston and two secondary damping cylinders and pistons arranged on opposite sides of the main piston and whose damping characteristics are superimposed upon those of the main cylinder. Further modifications will be

We claim:
1. A shock absorber comprising a main damping cylinder adapted to contain a damping fluid; a main damping piston and piston rod operable in said main cylinder; at least one secondary damping cylinder axially mounted within the main cylinder and having an open end directed toward the main piston; a secondary damping piston also secured to the said piston rod and operable in the secondary damping cylinder; and spring loaded relief and check valves in each of said pistons to permit controlled flow of damping fluid in each direction through each of said pistons as the said pistons are moved axially in their respective cylinders, the secondary cylinder and piston thereby providing an additional damping effect superimposed upon that of the main cylinder and piston.

2. A shock absorber according to claim 1, wherein the piston rod is movable axially so as to disengage said secondary piston from said secondary cylinder whereby the additional damping provided by the secondary piston is eliminated.

3. A shock absorber according to claim 1, having at least one flow passage extending through the wall of the secondary cylinder to permit flow of damping fluid between the secondary cylinder and the main cylinder whereby the additional damping action provided by the secondary cylinder may be varied by axial adjustment of the piston rod so as to vary the number of said flow passages lying on the pressure side of the secondary piston.

4. A shock absorber according to claim 1, having a plurality of flow passages of different diameter extending through the wall of the secondary cylinder to permit flow of damping fluid between the secondary cylinder and the main cylinder whereby the additional damping action provided by the secondary cylinder may be varied by axial adjustment of the piston so as to vary the number and size of flow passages lying on the pressure side of the secondary piston.

5. A shock absorber according to claim 1, having at least one flow passage extending through the wall of the secondary cylinder to permit flow of damping fluid between the secondary cylinder and the main cylinder whereby the additional damping action provided by the secondary cylinder may be varied by axial displacement of the piston rod so as to vary the number of said flow passages lying on the pressure side of the secondary piston, and wherein the piston rod is axially displaceable to disengage said secondary piston from said secondary cylinder thereby to eliminate the additional damping provided thereby.

References Cited by the Examiner

UNITED STATES PATENTS

| | | | |
|---|---|---|---|
| 986,378 | 3/11 | Furlow | 188—96 |
| 2,606,630 | 8/52 | Rossman | 188—88 |
| 2,724,590 | 11/55 | Irwin | 267—64 |
| 2,743,475 | 5/56 | MacNerland | 188—94 X |
| 2,783,859 | 3/57 | Patriquin | 188—88 |
| 2,924,304 | 2/60 | Patriquin | 188—88 |

FOREIGN PATENTS 227,397  3/60  Australia.

EUGENE G. BOTZ, *Primary Examiner.*